APPARATUS FOR BLOW MOLDING SEAMLESS HOLLOW OBJECTS

Original Filed Sept. 1, 1965 2 Sheets-Sheet 1

INVENTOR
EMERY I. VALYI
BY
ATTORNEY

March 30, 1971 E. I. VALYI Re 27,104

APPARATUS FOR BLOW MOLDING SEAMLESS HOLLOW OBJECTS

Filed Sept. 1, 1965 2 Sheets-Sheet 2

INVENTOR
EMERY I. VALYI

BY N. Leck

ATTORNEY

United States Patent Office

Re. 27,104
Reissued Mar. 30, 1971

27,104
APPARATUS FOR BLOW MOLDING SEAMLESS HOLLOW OBJECTS

Emery I. Valyi, 5200 Sycamore Ave., Riverdale, N.Y. 10471

Original No. 3,364,521, dated Jan. 23, 1968, Ser. No. 484,224, Sept. 1, 1965. Application for reissue Dec. 22, 1969, Ser. No. 887,279
Int. Cl. B29d *23/03*
U.S. Cl. 18—5 5 Claims

Matter enclosed in heavy brackets [ ] appears in the original patent but forms no part of this reissue specification; matter printed in italics indicates the additions made by reissue.

ABSTRACT OF THE DISCLOSURE

A one-piece blow mold having a top opening through which a blow core carrying a parison is inserted. The blow mold is shifted into and out of the path of the blow core as the latter is transferred axially from a parison die into blow position.

This invention relates to apparatus for blow molding articles of organic plastic material from a parison and has for an object to provide novel and improved means for accomplishing the above purpose.

The invention may be applied to an apparatus of the general type shown in copending application Ser. No. 353,004 filed Mar. 18, 1964, and now abandoned wherein a parison is formed in a parison die on a blow core by which it is transferred into a blow mold for blowing into the form of the finished article. After blowing the blow core is extracted from the blow mold and returned to the parison die to repeat the cycle.

Another object of the invention is to provide apparatus for blow molding which eliminates the parting line which is formed on the blown article when using a separable blow mold.

In accordance with the present invention the blow mold is of one piece construction and is formed with a top opening through which the blow core with the parison thereon is inserted. The blow mold is disposed at one side of the path of the blow core when the blow core is in parison injection position in the parison die. After the parison has been formed, the blow core is retracted axially from the parison die a sufficient distance to provide clearance for the blow mold which is then shifted transversely into the path of the blow core and between the blow core and the parison die. The blow core is then advanced into the blow mold and the article blown in the usual manner after which the blow core is again retracted from the blow mold, the latter is shifted laterally out of the path of the blow core into a discharge station wherein the blown article is extracted and the blow core is advanced into the parison die for the next injection operation.

The nature of the invention will be better understood from the following description, taken in connection with the accompanying drawings in which a specific embodiment has been set forth for purposes of illustration.

Figure 2:
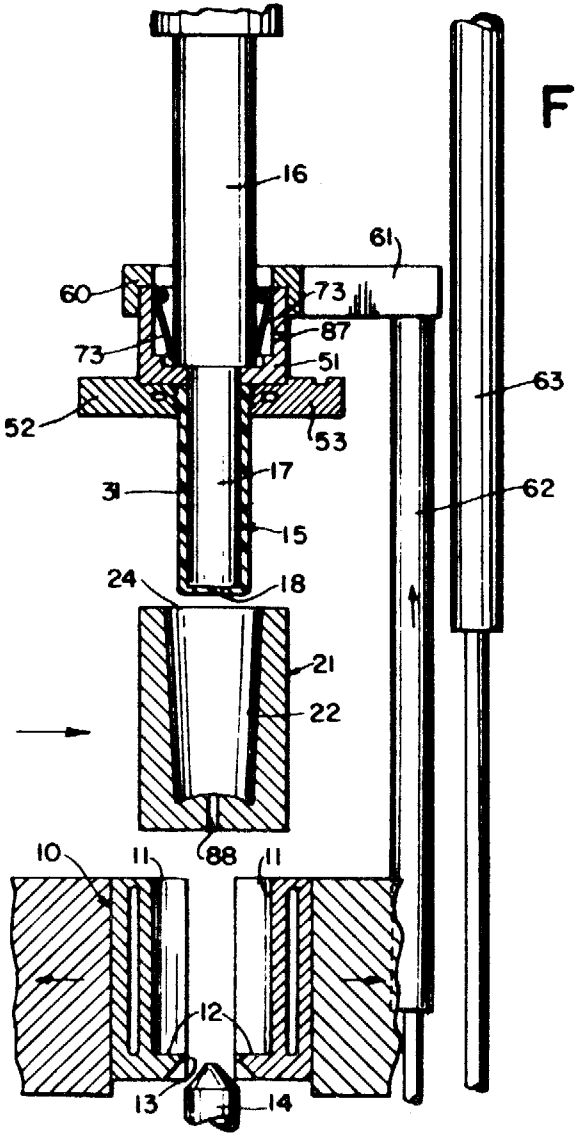
FIG. 2 is a view similar to FIG. 1 showing the blow core retracted and the blow mold in blow position.

Referring to the drawings more in detail the invention is shown as embodied in an apparatus comprising a parison die 10 having separable outer walls 11 adapted to form the outer surface of the parison walls and having an end wall 12 shaped to form the end wall of the parison. The end wall 12 of the parison die has an injection opening 13 registering with an injection nozzle 14 through which the organic plastic material is injected into the parison die. The parison die 10 is shown as split for opening to release the formed parison.

Figure 1:
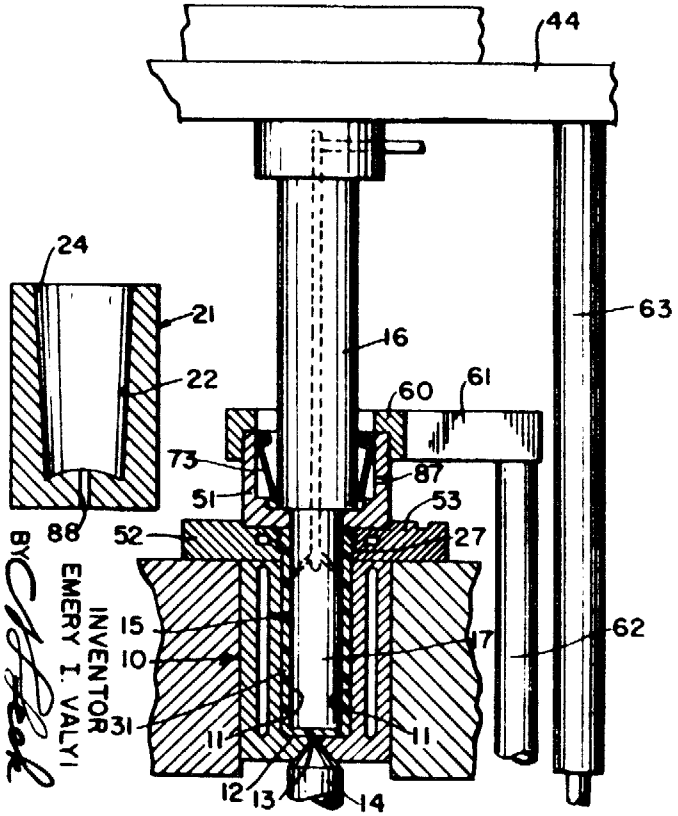
FIG. 1 is an elevation, partly in section, of an apparatus for carrying out the invention showing the blow core in parison forming position in the parison die.
Figure 5:
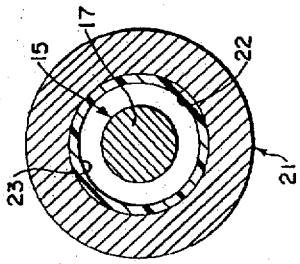
FIG. 5 is a section taken on the line 5—5 of FIG. 3 but on a larger scale.

The blow core 15 carried on a rod 16 is shown in FIG. 1 as disposed within the parison die 10 and is formed with cylindrical surface 17 and an end wall 18 shaped to form, with the walls 11 and 12 of the parison die, a die chamber in which the parison is formed. The blow core 15 is provided with the usual blow passages for admitting pressure fluid to expand the parison into the form of the finished article. The blow core rod 16 is connected to be actuated by a cross head 44 and a hydraulic cylinder 63 for advancing and retracting the blow core to its various operating stations.

A split neck ring composed of members 52 and 53 mounted on a carrier 51 is connected to be shifted by a sleeve 60, cross head 61 and hydraulic cylinder 62. In parison injection position, the neck ring is disposed adjacent the walls 17 of the parison die and is adapted to shape the neck of the parison and of the resulting blown article. A blow mold 21 of one piece unitary construction is formed with a cavity 22 shaped to form the finished article such as a bottle 23 and has on one side an opening 24 to receive the blow core 15.

FIG. 1 shows the parts in parison injection position with the blow core 15 in the parison die 10, the neck ring carrier 51 adjacent the parison die and with the blow mold 21 in discharge position out of the path of the blow core. With the parts in this position, the plastic material is injected through the nozzle 14 into the injection cavity to form the parison 31.

In the second step the parison die 10 is opened to release the parison and the blow core and the neck ring are retracted from the parison die a sufficient distance to provide clearance for the blow mold 21 which is then shifted transversely into the path of the blow core as shown in FIG. 2.

In a third step the blow core with the neck ring is advanced into the blow mold 21 and fluid is supplied under pressure through the blow core passages to blow the parison into the form of the blow mold cavity 22 to form the bottle 23.

Figure 4:
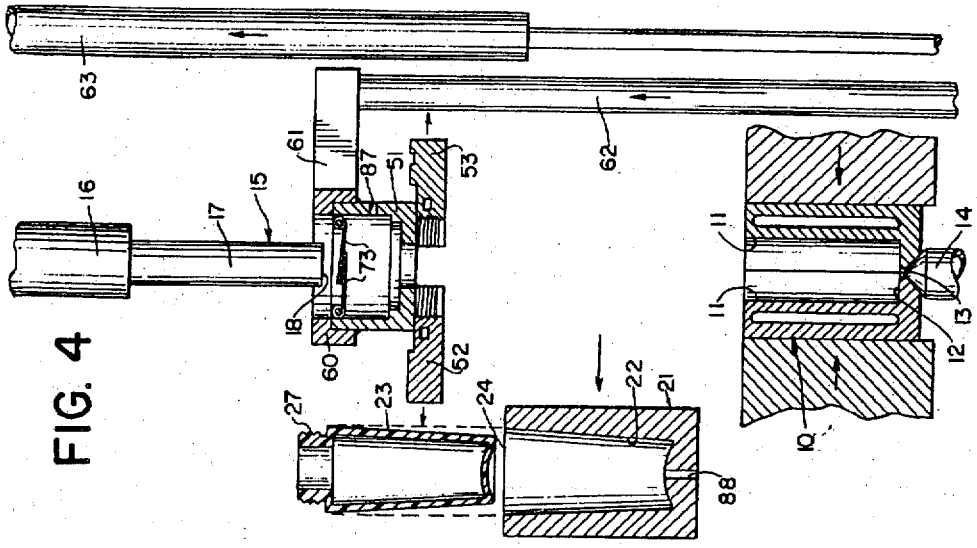
FIG. 4 is a view similar to FIG. 1 showing the blow mold in discharge position and the blow core retracted.
Figure 3:
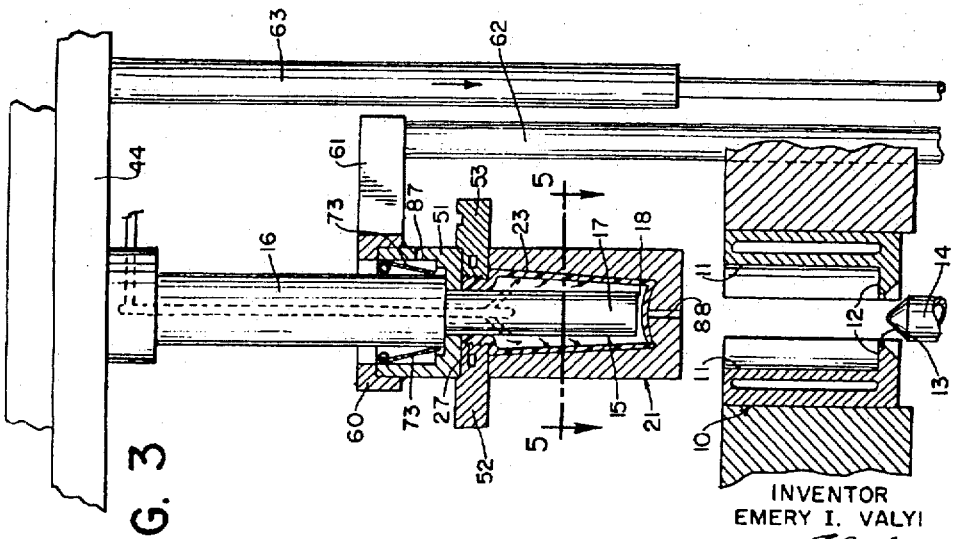
FIG. 3 is a view similar to FIG. 1 showing the blow core in blow position in the blow mold with the parison blown.

After the blowing operation the blow core is again retracted from the bottle 23 and from the blow mold 21 to the position shown in FIG. 4 and pressure may be maintained in the article by supplying air or other gas through passage 87 in the carrier 51. Trap doors 73 are disposed to close the end of sleeve 60 above the air passage for this purpose.

When the article has cooled to the proper state, the neck ring members 51 and 52 are separated, the neck ring carrier 51 retracted and the blow mold is shifted out of the path of the blow core into discharge position, wherein the finished article is extracted therefrom. During this extraction step, the blow core is returned to the parison die as in FIG. 1 for completing the cycle. Extraction of the finished article may be facilitated by applying air pressure or mechanical actuators, such as ejector pins, through openings 88 in the blow mold.

The mechanism for mounting and actuating the various parts is shown more in detail in the copending application above mentioned and therefore has been shown herein as is necessary for the understanding of the present invention.

This apparatus is particularly adapted for use in forming tapered articles such as wide mouth containers or cups extracted from a one piece blow mold without requiring that the blow mold be opened to release the article. Hence the time required for opening and closing a blow mold is eliminated from the cycle, the apparatus is correspondingly simplified and the parting line is eliminated from the finished article which is desirable for better appearance and to facilitate the subsequent decorating of the article.

What is claimed is:

1. Apparatus for making a blown article comprising a parison die having walls forming the outer surface of a parison die cavity, a blow core having walls forming the inner surface of said cavity, means for introducing organic plastic material into said cavity to form a parison, means retracting said blow core with the formed parison thereon axially from said die a sufficient distance to provide clearance for a blow mold, a blow mold having a mold cavity to form said blown article, said blow mold being of one piece unitary construction and having an opening in one side to receive said blow core, means shifting said blow mold transversely into the path of the blow core with said opening disposed toward said blow core, means advancing said blow core with the parison thereon through said opening into said blow mold cavity, means blowing the parison in said cavity to form said blown article, means retracting said blow core from said blow mold, means shifting said blow mold transversely out of the path of the blow core with the blown article therein, and means extracting said brown article from said blow mold.

2. Apparatus as set forth in claim 1 including a neck ring, and means shifting said neck ring with the blow core to injection and blowing positions.

3. Apparatus as set forth in claim 2 including means retracting said blow core from said neck ring after blowing, and means associated with said neck ring to maintain fluid pressure within the blown article in the blow mold during a cooling period.

4. Apparatus for making a blown article comprising a parison die having walls forming the outer surface of a parison die cavity, a blow core having walls forming the inner surface of said cavity, means for introducing organic plastic material into said cavity to form a parison, means retracting said blow core with the formed parison thereon axially from said die a sufficient distance to provide clearance for a blow mold, a blow mold having a mold cavity to form said blown article, said blow mold being of one piece unitary construction and having an opening in one side to receive said blow core, means shifting said blow mold transversely into the path of the blow core and between the blow core and the parison die with said opening disposed toward said blow core, means advancing said blow core with the parison thereon through said opening into said blow mold cavity, means blowing the parison in said cavity to form said blown article, means retracting said blow core from said blow mold, means shifting said blow mold transversely out of the path of the blow core with the blown article therein, and means extracting said blown article from said blow mold.

*5. Apparatus for making a blown article comprising a parison die having walls forming the outer surface of a parison die cavity, a blow core having walls forming the inner surface of said cavity, means for introducing organic plastic material into said cavity to form a parison, means retracting said blow core with the formed parison thereon axially from said die a sufficient distance to provide clearance for a blow mold, a closed blow mold having a cavity to form said blown article and having an opening in one side to receive said blow core, means shifting said blow mold transversely into the path of the blow core with said opening disposed toward said blow core, means advancing said blow core with the parison thereon through said opening into said blow mold cavity, means blowing the parison in said cavity to form said blown article, means separating said blow core from said blow mold and from the blown article therein, means shifting said blow mold transversely out of the path of the blow core and means extracting said blown article from said blow mold.*

References Cited

The following references, cited by the Examiner, are of record in the patented file of this patent or the original patent.

UNITED STATES PATENTS

| | | | |
|---|---|---|---|
| 2,262,612 | 11/1941 | Kopitke | 18—5X |
| 3,002,225 | 10/1961 | Goller | 18—5 |

H. A. KILBY, Jr., Primary Examiner